(12) United States Patent
Patel et al.

(10) Patent No.: US 8,560,384 B2
(45) Date of Patent: Oct. 15, 2013

(54) GENERATING A SCORE FOR A COUPON CAMPAIGN

(75) Inventors: Kavel Patel, Santa Clara, CA (US); Sajjit Thampy, Sunnyvale, CA (US)

(73) Assignee: Coupons.com Incorporated, Mt. View, CA (US)

( * ) Notice: Subject to any disclaimer, the term of this patent is extended or adjusted under 35 U.S.C. 154(b) by 0 days.

(21) Appl. No.: 13/345,551

(22) Filed: Jan. 6, 2012

(65) Prior Publication Data

US 2013/0179239 A1    Jul. 11, 2013

(51) Int. Cl.
*G06Q 30/00* (2012.01)

(52) U.S. Cl.
USPC ............... 705/14.13; 705/14.1; 705/14.41

(58) Field of Classification Search
USPC .................................................. 705/14.13
See application file for complete search history.

(56) References Cited

U.S. PATENT DOCUMENTS

| | | | |
|---|---|---|---|
| 4,745,468 A | 5/1988 | Von Kohrn |
| 4,876,592 A | 10/1989 | Von Kohrn |
| 4,926,255 A | 5/1990 | Von Kohrn |
| 5,034,807 A | 7/1991 | Von Kohrn |
| 5,057,915 A | 10/1991 | Von Kohrn |
| 5,128,752 A | 7/1992 | Von Kohrn |
| 5,227,874 A | 7/1993 | Von Kohrn |
| 5,249,044 A | 9/1993 | Von Kohrn |
| 5,283,734 A | 2/1994 | Von Kohrn |
| 5,368,129 A | 11/1994 | Von Kohrn |
| 5,508,731 A | 4/1996 | Kohrn |
| 5,697,844 A | 12/1997 | Von Kohrn |
| 5,713,795 A | 2/1998 | Von Kohrn |
| 5,759,101 A | 6/1998 | Von Kohrn |

(Continued)

FOREIGN PATENT DOCUMENTS

| | | |
|---|---|---|
| AU | 2006/294868 | 6/2011 |
| JP | 2010/055360 | 3/2010 |
| JP | 2010/0262652 | 11/2010 |
| KR | 2010/0025578 | 3/2010 |

OTHER PUBLICATIONS

Notification of Transmittal of the International Search Report and the Written Opinion of the International Searching Authority, or the Declaration, PCT Application No. PCT/US2012/059553 dated Mar. 18, 2013, 10 pages.

(Continued)

*Primary Examiner* — John G Weiss
*Assistant Examiner* — Scott C Anderson
(74) *Attorney, Agent, or Firm* — Hickman Palermo Truong Becker Bingham Wong LLP; Daniel D. Ledesma

(57) ABSTRACT

Techniques are provided for generating, by a coupon distributor, a score that represents a quality of a coupon campaign that a coupon provider offers to the coupon distributor. The score may be generated based on the brand of the product, the product category to which the product belongs, the coupon value, and the percentage discount reflected by the coupon. One or more of these factors may be based on historical data that indicates the success (or failure) of previous coupon campaigns (e.g., of the same product, brand, and/or product category, and/or similar coupon value). The coupon distributor uses the score to, e.g., determine whether to accept a proposed coupon campaign, project the number of prints/redemptions of the coupon campaign, determine how to present the coupon, determine an amount to charge for running the coupon campaign, and/or determine products or product categories of coupons to which the coupon distributor should seek.

45 Claims, 4 Drawing Sheets

(56) References Cited

U.S. PATENT DOCUMENTS

| | | |
|---|---|---|
| 5,761,648 A | 6/1998 | Golden et al. |
| 5,791,991 A | 8/1998 | Small |
| 5,907,830 A | 5/1999 | Engel et al. |
| 5,916,024 A | 6/1999 | Von Kohrn |
| 5,974,399 A | 10/1999 | Giuliani et al. |
| 6,321,208 B1 | 11/2001 | Barnett |
| 6,336,099 B1 | 1/2002 | Barnett et al. |
| 6,609,104 B1 | 8/2003 | Deaton et al. |
| 6,965,868 B1 | 11/2005 | Bednarek |
| 7,248,693 B1* | 7/2007 | Tretter et al. .................. 380/55 |
| 7,418,451 B2* | 8/2008 | Leung et al. ......................... 1/1 |
| 7,640,240 B2 | 12/2009 | Boal et al. |
| 7,734,621 B2 | 6/2010 | Weitzman et al. |
| 7,761,378 B2 | 7/2010 | Postrel |
| 7,784,702 B2 | 8/2010 | Michels |
| 7,962,931 B2 | 6/2011 | Bova |
| 8,000,496 B2 | 8/2011 | Keswanie et al. |
| 8,055,642 B2 | 11/2011 | Boal et al. |
| 8,165,078 B2 | 4/2012 | Walsh et al. |
| 2004/0267611 A1* | 12/2004 | Hoerenz ...................... 705/14 |
| 2007/0156523 A1* | 7/2007 | Liu et al. ...................... 705/14 |
| 2008/0065490 A1 | 3/2008 | Novick et al. |
| 2009/0061884 A1 | 3/2009 | Rajan et al. |
| 2010/0042490 A1 | 2/2010 | Boal |
| 2010/0088166 A1* | 4/2010 | Tollinger ................. 705/14.13 |
| 2010/0250351 A1* | 9/2010 | Gillenson et al. ......... 705/14.13 |
| 2011/0078009 A1 | 3/2011 | Macaluso |
| 2011/0106598 A1 | 5/2011 | McCann et al. |
| 2013/0103474 A1 | 4/2013 | Goel et al. |

OTHER PUBLICATIONS

Claims from PCT Application No. PCT/US2012/059553, dated Mar. 2013, 4 pages.

Notification of Transmittal of the International Search Report and the Written Opinion of the International Searching Authority, or the Declaration, PCT Application No. PCT/US12/59568 dated Mar. 29, 2013, 8 pages.

Claims from PCT Application No. PCT/US12/59568, dated Mar. 2013, 3 pages.

* cited by examiner

GENERATING A SCORE FOR A COUPON CAMPAIGN

RELATED APPLICATION

This application is related to U.S. patent application Ser. No. 13/277,152 filed on Oct. 19, 2011, entitled "Determining A Value For A Coupon"; the entire content of which is incorporated by this reference for all purposes as if fully disclosed herein.

TECHNICAL FIELD

Embodiments relate generally to determining, on behalf of a coupon provider and based on multiple factors, a value for a coupon.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In general, a coupon is a certificate or other document that entitles its holder to accept an offer described or referenced by the coupon. The offer, also subsequently referred to as the "coupon offer," may be any type of offer, but typically is an offer by the coupon provider to provide a customer with one or more goods or services at a particular price or discount. For example, a coupon might indicate $1 off or 25% off of the purchase price or might indicate a particular price, such as $10. Alternatively, the coupon offer may be an offer to provide the customer with a gift in exchange for the performance of an act, such as purchasing a good or service.

A coupon often takes a "hard copy" form, such as a paper certificate, with printed images and/or text describing terms of the offer. "Redeeming" a coupon is the process of a customer accepting a coupon offer by presenting, referencing, or otherwise providing the coupon while purchasing, contracting, or otherwise transacting with another party. For example, a customer may redeem a hard copy of a coupon by handing the copy to a clerk during a purchase at a retail store. The clerk may then provide the customer with the offered discounted price or gift.

One technique for distributing coupons is to include printed coupons with newspapers, magazines, or other items that are distributed to customers. One example of an item with which coupons are distributed is a printed receipt. For example, some retailers print receipts at a point of sale on register paper on which coupons have been pre-printed. As another example, some retailers print coupon(s) on a receipt at the time of the transaction for which the receipt is printed, thereby allowing the retailers to dynamically select which coupon(s) appear on the receipt based on the product(s) that were purchased during the transaction.

Recent distribution techniques now provide customers with opportunities to print their own coupons. For example, a number of websites provide search engines or catalogs with which customers may locate offers and then print coupons for the offers they find. The printed coupons may be used in the same manner as any other coupon.

Other recent distribution techniques involve creating digital coupons. One such technique involves creating unique digital coupons that are saved to an account associated with the customer, such as a store loyalty account. The customer may redeem such digital coupons during online or physical transactions by presenting an account identifier, such as a store loyalty card or an oral identification of the customer's telephone number, for the associated account.

Another digital coupon-based technique involves creating unique digital coupons that may be stored on a computing device. The digital coupons may be transmitted from the computing device at a point-of-sale during a transaction using any of a variety of mechanisms. Thus, there are numerous ways in which coupons might be distributed to customers.

Currently, coupon distributors receive, from numerous coupon providers, requests to run coupon campaigns, which involve distributing coupons provided by those providers. Attributes of a typical coupon campaign include the value of a coupon, an identity of the product, the brand of the product, the manufacturer of the product, a planned or target redemption rate, a duration of the campaign, and a cost to run the campaign (for example, price per print or a fixed total amount). Another attribute includes the process a user must go through in order to access a coupon. For example, some coupon distributors require users to enter personal information, while other distributors might require users to complete a survey. Current techniques do not adequately take into account the varying degree in quality of each coupon campaign when accepting proposed coupon campaigns or when displaying coupons of accepted coupon campaigns.

DESCRIPTION OF EXAMPLE EMBODIMENTS

Figure 1:
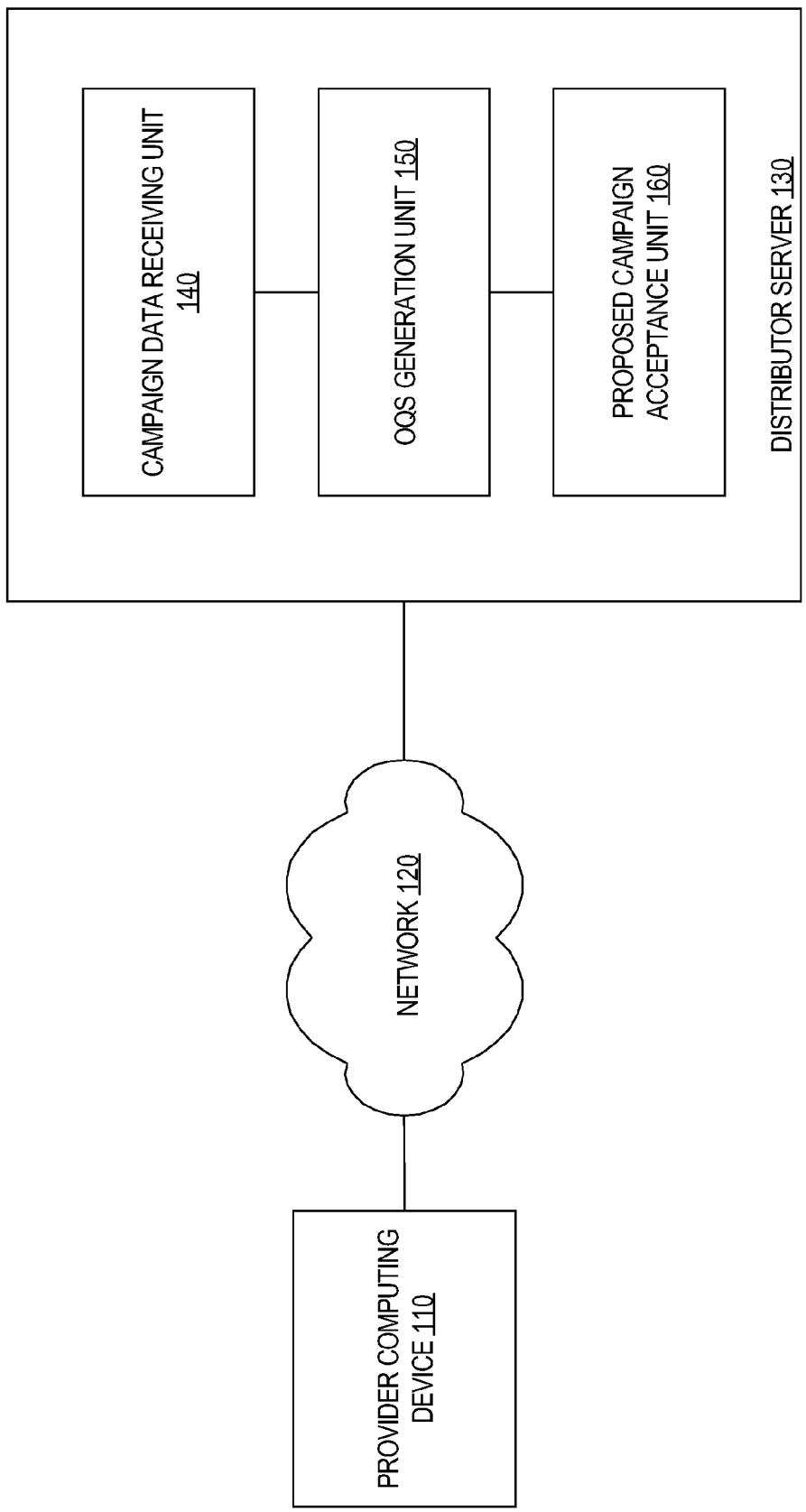
FIG. 1 is a block diagram that depicts an example system for computing an offer quality score (OQS).

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Functional Overview
3.0 Generating An Offer Quality Score
4.0 Leveraging An Offer Quality Score
    4.1 Accepting, Adjusting, and Declining
    4.2 Directing Coupon Campaign Offers to Other Distributors
    4.3 Print/Redemption Projector
    4.4 Price Estimator
    4.5 Presentation Component
    4.6 Content Acquisition
5.0 Implementation Mechanism—Hardware Overview
6.0 Extensions and Alternatives

1.0 General Overview

Techniques are disclosed for generating an offer quality score ("OQS") for a coupon campaign and using an OQS in various ways. Typically, a coupon distributor treats most, if not all, coupon campaigns the same (and, by extension, the corresponding coupon providers) in that the coupon distributor charges each coupon provider the same rate (for example, $0.10 per printed coupon) or the same amount for each proposed coupon campaign, regardless of whether the coupon provider represents a small regional brand, a large national brand, or something in between. To the extent that a coupon distributor charges a coupon provider a different rate or amount for running a coupon campaign relative to other coupon campaigns, such a difference typically reflects a subjective determination by the coupon distributor to charge coupon providers representing large, well-established brands a lower rate in order to attract future offers, from that coupon provider, for running coupon campaigns. A coupon distributor might charge less to popular brands that offer generous coupon values because the costs incurred by the coupon distributor to distribute such coupons to influence the printing of those coupons by potential customers is typically less than the cost to influence the printing of coupons of coupon campaigns associated with, for example, less popular brands or relatively low coupon values. The costs incurred for running a coupon campaign might refer to an amount of resources that a coupon distributor allocates to distributing a coupon of the coupon campaign. Such resources might include a frequency with which the coupon distributor displays a coupon and/or a position of the coupon on the home page of a website maintained by the coupon distributor or on the first page of a search results page of coupons.

In an embodiment, an OQS represents the quality associated with a coupon campaign (or an offer to accept a coupon campaign) from a coupon provider. A coupon distributor takes into account one or more criteria to automatically generate an OQS for a coupon campaign. Example criteria include: the brand of the product, the product itself, and/or the product category to which the product belongs; the proposed coupon value; the percentage discount; historical data regarding previous coupon campaigns for the product, product category, and/or brand.

The coupon distributor then uses the OQS of a coupon campaign for one or more purposes. Example purposes include: determining whether to accept the corresponding coupon campaign proposed by a coupon provider; determining what factors the coupon provider might change to increase the OQS; predicting what the expected number of prints and/or redemptions of a coupon will be if the corresponding coupon campaign is accepted by the coupon distributor; determining whether to direct the proposed coupon campaign to another coupon distributor; determining how and/or what to charge for the corresponding coupon campaign; determining how to present, to potential customers, a coupon of the corresponding coupon campaign.

2.0 Functional Overview

In embodiments that involve communication between a coupon distributor and a coupon provider, such communication may be between two computing devices over a network (for example, the Internet), where one computing device is operated by the coupon provider and the other computing device is operated by the coupon distributor. Computing devices may comprise desktop computers, laptop computers, tablet computers, mobile phones, and other handheld computing devices.

The coupon distributor may provide a web service that the coupon provider accesses with its computing device. The web service may involve sending, in response to a request from the provider's computing device, a web page that includes one or more fields into which a representative of the coupon provider can input information regarding a proposed coupon campaign. Alternatively, the same information may be received programmatically by a call to the web service. Such information might include the product's name, a product category to which the product belongs, a value for a coupon, a hoped-for or target redemption rate, a target number of prints, a brand name, and a duration for the proposed coupon campaign. The coupon provider's computing device sends the entered information over a network (such as the Internet) to the coupon distributor's computing device, which generates a score based on the entered information.

Alternatively, communication between a coupon provider and a coupon distributor may occur between human representatives of the two parties, such as an in-person conversation or a conversation via telephone. In this case, the coupon distributor's representative enters in the appropriate information via an input device of a computer, which generates a scored based on the entered information.

3.0 Generating an Offer Quality Score

According to an embodiment, a coupon distributor generates an offer quality score (OQS) that represents a quality of a coupon campaign offered by a coupon provider, whether the coupon campaign has been accepted by the coupon distributor ("an accepted coupon campaign") or not ("a proposed coupon campaign"). An OQS is based on one or more factors and may be a normalized value that is between, for example, 0 and 10 or 0 and 1. Each of the one or more factors acts as input to an OQS generating function which, when executed, generates an OQS.

Examples of factors upon which an OQS may be based include: attributes of the coupon provider, brand, and/or product of the coupon campaign; the coupon value of the coupon campaign; the percentage discount reflected in the coupon value (for example, a $1 coupon for a $10 product indicates a 10% discount whereas a $1 coupon for a $3 product reflects a 33% discount); and historical data regarding previous coupon campaigns for the product, product category, and/or brand. The set of one or more factors that are used to generate an OQS are referred to herein as "OQS factors."

Embodiments are not limited to how the values for the OQS factors (or "factor values") are determined. For example, each factor may be associated with a set of mappings that map a factor value with a factor score. Thus, there may be a brand score mapping, a product category score mapping, a coupon value score mapping, a percentage discount score mapping, and a seasonality score mapping. In other words, different brands may be associated with different brand scores, different product categories may be associated with different category scores, and so forth. For example, General Mills may have a brand score of 10 while Great Value may have a brand score of 8.4. As another example, baby diapers may have a brand score of 9.2 while toothpaste has a brand score of 6.1.

Seasonality refers to the phenomenon that potential customers have different price sensitivities at different times of the year. For example, a $1 coupon for a set of toothbrushes may be more attractive to potential customers during August (right before many schools start) and during December (right before Christmas) than during other times of the year. This change in price sensitivity over time may be common to many products and certain product categories. Other products may be associated with price sensitivities that change at different times of the year. For example, certain products that are typically used for a particular national holiday may be sold in large quantities right before that date. Thus, coupons for such products do not need to have as high coupon values at that time of the year because more people will be buying those products. Therefore, relatively high coupon values are not necessary at that time of year.

Given the time of year (or season) in which a coupon campaign is proposed to be run, a coupon distributor might determine, based on seasonality data, whether potential customers are likely to be interested in the product that is the subject of the coupon campaign. The seasonality data may be organized based on specific product and/or product category. Thus, for example, the coupon distributor might determine a product category to which the product (that is subject of the campaign) belongs, identify the time of year in which the coupon campaign is to be run, identify the product category in the seasonality data, and identify, within the seasonality data, one or more metrics that are associated with the product category and that measure the demand for that product at the identified time of year. The possible metrics that measure seasonality may be reflected in a seasonality score mapping.

A brand score mapping may be based on third party data, such as brand penetration data from Nielsen, an advertising and research company. Brand penetration data indicates a percentage of households that a particular brand has "penetrated." Brand "penetration" of a particular brand may indicate a number of households that have (a) purchased a product of the particular brand or (b) been exposed (for example, in the form of TV ads) to the particular brand. Such brand penetration data may be used to generate a brand score mapping. For example, 70% penetration and above may be mapped to a brand score of 10, 60%-70% penetration may be mapped to a brand score of 9, 45%-60% penetration may be mapped to a brand score of 8, 35%-45% penetration may be mapped to a brand score of 7, and so forth.

In an embodiment, one or more OQS values are based on a first set of factors and one or more other OQS values are based on a second set of factors that are different than the first set of factors. For example, a first OQS value generated for a first coupon campaign is based solely on the coupon value and a score that represents the popularity of the corresponding brand while a second OQS value generated for a second coupon campaign is based on previous coupon campaigns that involved the second campaign's product or products in the same product category as the second campaign's product.

The following is an example equation that may be used to generate an OQS value:

$$OQS = \sum_{i=0}^{10} P(i \mid D1, D2, D3, D4) \times i$$

where D1 represents brand penetration, D2 represents an average number of prints for a "similar" campaign (for example, for the same product, same product category, or same brand), D3 represents an average revenue per print for a similar campaign, and D4 represents a seasonality score. $P(i \mid D1, D2, D3, D4)$ is the probability that D1 maps to an OQS value of i, where i is any value between 0 and 10. The probabilities may be computed using a Bayesian approach and a (for example, human-edited) table in order to learn the distributions.

For example, a particular coupon provider desires a coupon distributor to run a coupon campaign for a particular product marketed by the particular coupon provider. The particular product is associated with a certain brand that has a certain degree of brand penetration (e.g., "p"). An outside data source, such as Nielsen, may be used to determine 'p'. Brands in similar categories follow the data shown in the table below.

| Brand Penetration | P(OQS = 0.01) | P(OQS = 0.02) | ... | P(OQS = 0.99) |
|---|---|---|---|---|
| 1% | x1 | x2 | ... | x99 |
| 2% | y1 | y2 | ... | y99 |
| ... | ... | ... | ... | ... |
| 99% | z1 | z2 | ... | z99 |

Using a table similar to the above, for any given value of 'p', the OQS for this value may be computed as the weighted sum of all the probabilities. For example, if 'p'=2%, then the OQS for brand penetration is (0.01*y1+0.02*y2+0.03*y3+ . . . 0.99*yN)/N. This computation results in an OQS for the factor D1.

A similar process is repeated for any factor Di which has a value='x'. The goal is to arrive at a probability distribution that the OQS is 0.01 given x, that the OQS is 0.02 given x, and so on, and then calculating a weighted average of the resulting sum. The process for combining all the values from the various Di's together to the final OQS may also done in a similar fashion. For example, if there are two Di's, D1 & D2, then the above table would be the joint distribution of D1 and D2 representing all possible combinations that values D1 & D2 could take.

For purposes of illustrating a clear example, a method of generating an OQS value has been provided above in the form of an equation and symbols. In an embodiment, each of the symbols may comprise a data value stored in a computer and each of the relationships expressed in the equation may be implemented using stored program logic, in a special-purpose computer or loaded from one or more non-transitory media into the memory of a general-purpose computer and then executed. Each of the values may be stored in a particular location in electronic digital memory of the computer. Each of the relationships expressed in the equation involves changing the state of one or more of the locations of memory and transforming the state into a new state associated with a new value. Thus, the equation disclosed herein is not intended to represent an abstract idea but in at least one embodiment indicates a particular method of transforming electronic digital memory of a computer from one state to a different state that provides a useful result.

FIG. 1 is a block diagram that depicts an example system 100 for computing an OQS. System 100 includes provider computing device 110, network 120, and distributor server 130. In an embodiment, distributor server 130 is a special purpose computer that includes three components: a campaign data receiving unit 140, an OQS generation unit 150, and a proposed campaign acceptance unit 160. Units 140-160 may be implemented software, hardware, or a combination of hardware and software. Although distributor server 130 is depicted as a single device, the functionality of distributor server 130 may instead be implemented among multiple devices. For example, the resources of multiple computing devices may be used to receive campaign data, generate an OQS, and determine whether to accept a proposed campaign based on the OQS.

Campaign data receiving unit 140 receives campaign data that originates from provider computing device 110, identifies one or more values of one or more attributes of the proposed campaign reflected in the campaign data, and sends the one or more values to OQS generation unit 150. Alternatively, campaign data receiving unit 140 sends the campaign data to OQS generation unit 150, which performs the identification step.

Examples of attribute values identified in the campaign data might include the coupon provider, the brand (e.g., Kelloggs), the product (e.g., Frosted Flakes), the product category (e.g., breakfast cereal), the coupon value (e.g., $1), and the percentage discount (e.g., 20%). Some of the attribute values may be reflected in the campaign data, but may instead be determined by distributor server 130. For example, campaign data receiving unit 140 (or another unit of distributor server 130) might access a database that maps products to product categories so that the coupon provider is not required to identify the product category in the campaign data transmitted from provider computing device 110. As another example, campaign data receiving unit 140 (or another unit of distributor server 130) might calculate the percentage discount determining a current sale price of the product and dividing the coupon value by the current sale price. In this way, the coupon provider is not required to calculate the percentage discount.

Figure 2:
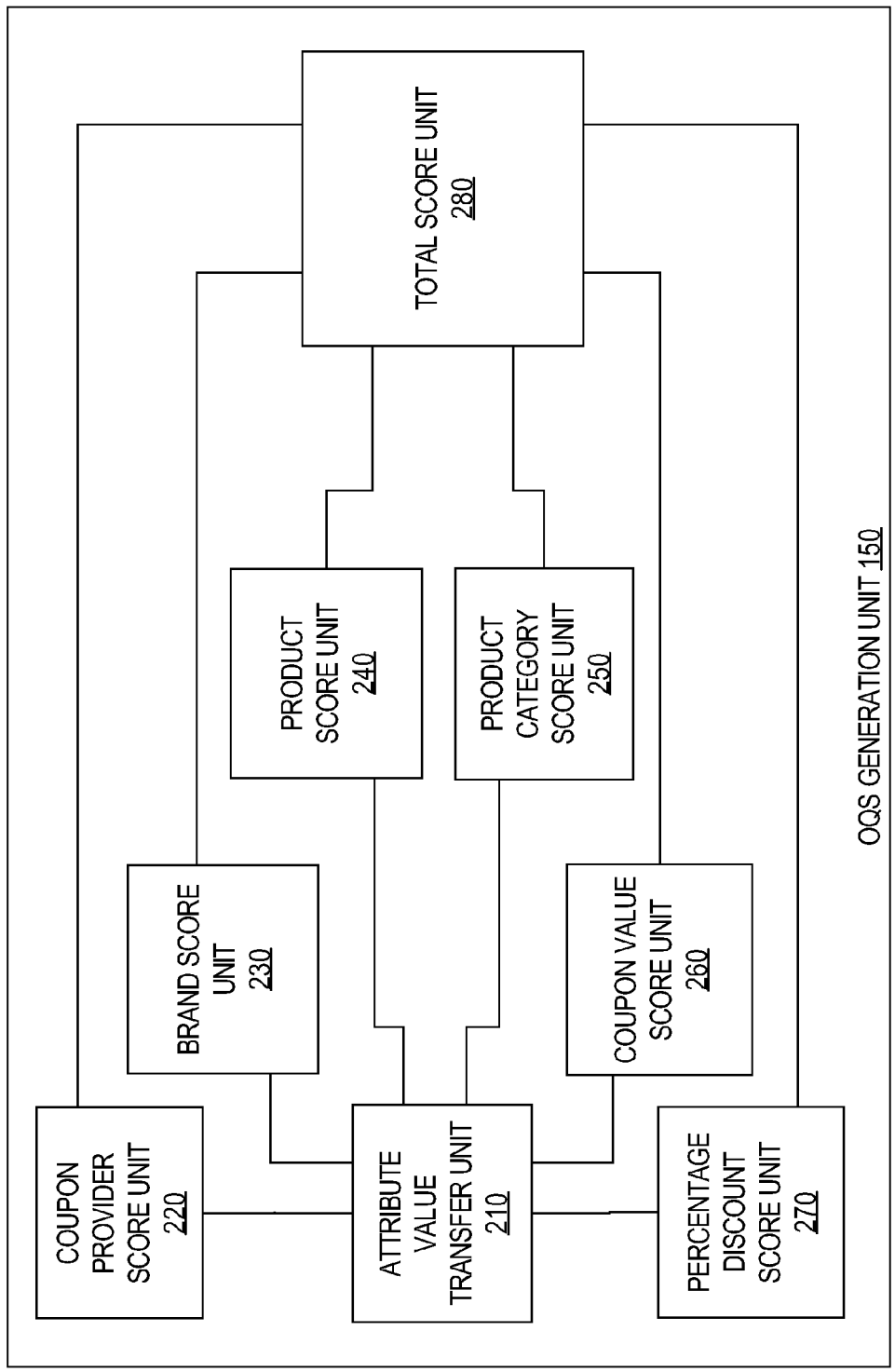
FIG. 2 is a block diagram that depicts components of an OQS generation unit.

FIG. 2 is a block diagram that depicts units of OQS generation unit 150. In an embodiment, OQS generation unit 150 includes special-purpose hardware logic that operate together for generating an OQS for a particular coupon campaign. OQS generation unit 150 includes attribute value transfer unit 210, which sends each identified attribute value to the appropriate score unit, examples of which include coupon provider score unit 220, brand score unit 230, product score unit 240, coupon value score unit 250, percentage discount score unit 260, and coupon provider score unit 270. For example, attribute value transfer unit 210 sends, to coupon provider score unit 220, data that identifies a particular coupon provider. Coupon provider score unit 220 generates a score based on that data. As another example, attribute value transfer unit 210 sends, to brand score unit 230, data that identifies a particular brand. Brand score unit 230 generates a score based on the data.

Once each score unit 220-270, after generating a respective score, sends its generated score to total score unit 280 that generates an OQS based on each individual score received from units 220-270. Total score unit 280 then sends the OQS to proposed campaign acceptance unit 160, depicted in FIG. 1. Proposed campaign acceptance unit 160 determines, based on the OQS received from OQS generation unit 150, whether to accept the proposed campaign reflected in the campaign data received from provider computing device 110. The determination may be made by comparing the OQS to a particular (or "OQS") threshold. The OQS threshold may defined by a user of distributor server 130 or may be defined automatically (e.g., without user input) by distributor server 130 or other computing devices operated by the coupon distributor. Also, the OQS threshold may change over time. For example, if the coupon provider receives higher quality coupons over time, then the OQS threshold may be increased since the coupon provider might not be able accept all proposed campaigns without jeopardizing currently-running coupon campaigns. Either way, distributor server 130 (for example, proposed campaign acceptance unit 160 or another component of distributor server 130) sends, over network 120, to provider computing device 110, a response message indicating whether the proposed campaign is accepted by the coupon distributor.

4.0 Using an Offer Quality Score

Once an OQS is generated for a coupon campaign, the OQS can be used in numerous ways, as described in the following examples. When a coupon distributor uses an OQS, the coupon campaign may or may not have been accepted. Further, the OQS may have been generated in any number of ways, whether described herein or not. Embodiments are not limited to any of the following example uses. For example, one embodiment may use an OQS in one of the described ways while another embodiment may use an OQS in two or more of the other described ways.

4.1 Accepting, Adjusting, and Declining

Figure 3:
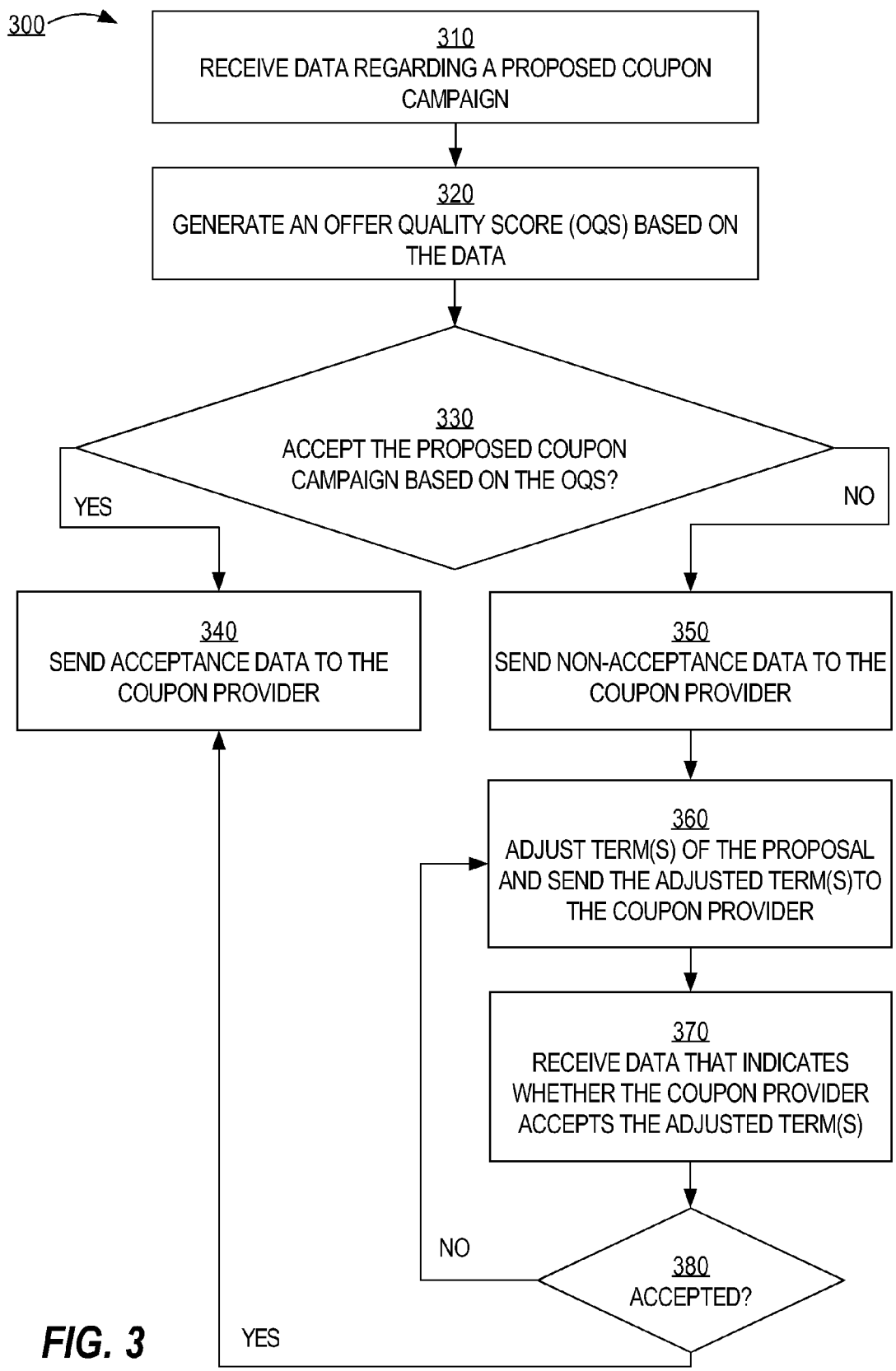
FIG. 3 illustrates a process for using an OQS to accept or decline a proposed coupon campaign.

In an embodiment, a coupon distributor uses an OQS as at least one factor in determining whether to accept a proposed coupon campaign. FIG. 3 is a flow diagram that depicts a process for using an offer quality score (OQS) to accept or decline a proposed coupon campaign, according to an embodiment. In an embodiment, blocks shown in FIG. 3 may be performed by one or more computing devices operating on behalf of a coupon distributor. For example, each block of FIG. 3 may represent one or more sequences of computer program instructions that are stored on one or more non-transitory machine-readable media, loaded into memory and executed to cause performance of the blocks of FIG. 3.

In the example process 300 of FIG. 3, at block 310, the coupon distributor receives campaign data regarding a proposed coupon campaign. In an embodiment, a coupon distributor computer receives an electronic message that contains data fields carrying values that represent a particular coupon campaign.

At block 320, the coupon distributor generates an OQS based on the campaign data. In an embodiment, the OQS value is generated using either a special-purpose computer associated with the coupon distributor and configured to generate an OQS using special-purpose hardware logic that implements the equation described herein, or a general-purpose computer associated with the coupon distributor and configured to load program instructions from one or more non-transitory machine-readable media which, when executed, cause the computer to implement the equation described herein.

At block 330, the coupon distributor determines whether it will accept the proposed coupon campaign based on the OQS. For example, if an OQS of a proposed coupon campaign is above a particular threshold value (for example, 7 on a 10-point scale), then the coupon provider will accept the proposed coupon campaign. Otherwise, the coupon provider will not accept the proposed coupon campaign.

If the coupon distributor accepts the proposed coupon campaign, then, at block 340, the coupon distributor sends, to the coupon provider, data that indicates that the proposed coupon campaign is accepted. The coupon distributor begins the proposed coupon campaign according to one or more details of the proposal. The coupon distributor may accept a proposed coupon campaign even though the coupon distributor anticipates that it may make very little or no profit on the proposed coupon campaign. The coupon distributor may do this in order to establish a relationship with a particular coupon provider that turns into future business with that provider.

If, at block 330, the coupon distributor determines that it will not accept the proposed coupon campaign (for example, based on a relatively low OQS for the proposed coupon campaign), then, at block 350, the coupon distributor informs the coupon provider as much.

Optionally, at block 360, the coupon distributor adjusts one or more terms of the proposed coupon campaign and suggests, to the coupon provider, the adjusted term(s). Non-limiting examples of such terms include coupon value, percentage discount represented by the coupon value, target redemption rate, charge per print, and length or duration of the proposed coupon campaign For example, if a proposed coupon campaign indicates a target redemption rate of 1000, then the coupon distributor might suggest, to the coupon provider, a target redemption rate of 800. As another example, if a proposed coupon campaign indicates a coupon value of $1.50, then the coupon distributor might suggest, to the coupon provider, a coupon value of $1.95. As another example, if a coupon provider desires to pay $0.10 per print for a proposed coupon campaign, then the coupon distributor might suggest, to the coupon provider, $0.13 per print.

In order to generate the adjusted term(s), the coupon distributor might "guess" or estimate a new value for a particular attribute of the proposed coupon campaign, submit that new value (along with other values) into an OQS generating function, and execute the function to generate a new OQS. If the new OQS is higher than, for example, a particular threshold value, then, at block 370, the coupon distributor provides (as part of block 360), to the coupon provider, the adjusted term(s) and, optionally, other non-changing terms.

At block 370, the coupon distributor receives data that indicates whether the coupon provider accepts the terms of the updated proposed coupon campaign.

At block 380, the coupon distributor determines whether the coupon provider accepts the updated proposal. If so, then process 300 proceeds to block 340 where the coupon distributor sends, to the coupon provider, an acknowledgement that the coupon distributor will execute the proposed coupon campaign according to the agreed upon terms.

If, at block 380, the coupon distributor determines that the coupon distributor does not accept the updated proposal, then process 300 might proceed to block 360 where the coupon distributor adjusts the one or more terms further (and/or one or more other terms) and generates another new OQS, and then provides the newly adjusted terms to the coupon provider. This process in blocks 360-380 (i.e., the coupon distributor adjusting and providing terms to the coupon provider and the coupon provider rejecting) may repeat one or more times until (a) the coupon provider accepts the latest adjusted terms or ceases to provide any feedback (for example, "walks away" from the negotiation, which may be entirely online), or (b) the coupon distributor ceases to provide, to the coupon provider, any further adjusted terms.

Submitting terms of a proposed coupon campaign to a coupon distributor may be carried out in multiple ways. In an embodiment, the coupon distributor maintains a web service that coupon providers may access over the Internet, that receives one or more terms of a proposed coupon campaign, and that responds with an affirmative or negative indication that the proposed coupon campaign is accepted. For example, a representative of the coupon provider directs a web browser (executing on a device operated by the representative) to a particular URL of the coupon distributor to display a corresponding web page. The representative enters details of the proposed coupon campaign into the web page. The representative provides input that triggers the sending of the details (for example, using HTTP) from the representative's device over a network to a server device operated by the coupon distributor. Thus, block 310 may involve the server device receiving the details as input. Also, block 320 may involve the server device (or one or more other devices) computing an OQS based on the input.

In a related example, instead of a web page, the representative selects a software application that executes on the representative's device and that is dedicated to performing the functions of accepting input that reflects the terms of the proposed coupon campaign and indicating whether the coupon distributor will accept the proposed coupon campaign based on the OQS. The software application may generate the OQS and make the determination of whether to accept the coupon campaign or may communicate the terms of the proposed coupon campaign to a remote server that generates the OQS and makes the determination. Alternatively, embodiments may use special-purpose computers configured with logic that performs functionally equivalent tasks and services.

In an alternative embodiment, a human representative of a coupon provider verbally provides (for example, over the phone or in person) details of a proposed coupon campaign to a human representative of a coupon distributor who enters the data into a device. That device and/or one or more other devices use the entered data to generate an OQS and determine, based on the OQS, whether to accept a coupon campaign.

4.2 Directing Coupon Campaign Offers to Other Distributors

In an embodiment, a coupon distributor uses an OQS to determine whether to direct a coupon campaign (whether accepted or not) to another coupon distributor. A particular coupon distributor may be affiliated with (or have a business relationship with) one or more other coupon distributors (hereinafter "affiliates"). The particular coupon distributor and the set of affiliates with which the particular coupon distributor is affiliated are referred to herein as a "coupon distribution network." An affiliate may operate a website on a specific topic, such as women's health issues. The affiliate adds code to its website that, when executed, causes the particular coupon distributor to send coupons for products that are pertinent to women's health issues. In this way, the affiliate acts as a distribution point for coupons sent from the particular coupon distributor.

Each affiliate in a coupon distribution network has its own revenue sharing agreement (RSA) with the particular coupon distributor. An RSA dictates how much the particular coupon distributor will pay the affiliate for distributing coupons. A RSA may be based on one of many payment models. For example, one payment model is a pay fixed per print payment model where the coupon distributor pays a fixed amount (for example, $0.05) for each print of a coupon (i.e., presented by the affiliate) by an end-user. Another payment model is a pay percentage per print payment model where the coupon distributor pays a percentage (for example, 40%) of what the coupon distributor charges to the coupon provider for each print of a corresponding coupon. An RSA may be based on a non-print payment models. Not only may some affiliates have more generous RSAs with the particular coupon distributor than other affiliates, some affiliates may have RSAs with the particular coupon distributor that are based on payment models that are different than the payment models upon which RSAs of other affiliates are based.

The particular coupon distributor might determine whether to direct a proposed coupon campaign to an affiliate based on one or more criteria. For example, the particular coupon distributor might accept, for itself, a proposed coupon campaign whose OQS is above a first threshold (for example, above 8 on a 10-point scale) while the particular coupon distributor might accept and send, to an affiliate, a proposed coupon campaign whose OQS is above a second threshold (for example, above 6 on a 10-point scale) but below the first threshold. In this way, the particular coupon distributor leverages OQS values by accepting for itself the coupon campaigns associated with the highest OQS values and directing coupon campaigns of slightly lower quality (as reflected by their OQS values) to affiliates.

Additionally or alternatively, the particular coupon distributor uses an OQS as at least one criterion in determining the terms of an RSA with an affiliate. For example, the higher the OQS, the less revenue the particular coupon distributor will pay the affiliate under an RSA. Conversely, the lower the OQS, the more revenue the particular coupon distributor will pay the affiliate under an RSA. For example, if a typical RSA is that an affiliate receives $0.05 per print of each coupon, then an RSA may dictate that the affiliate will receive $0.08 per print of a coupon if an OQS associated with that coupon is relatively low. As another example, an RSA might dictate that the affiliate will receive $0.02 per print of a coupon if an OQS associated with that coupon is relatively high. Thus, a coupon distributor may use an OQS as a factor to dictate the terms of an RSA with an affiliate.

4.3 Print/Redemption Projector

In an embodiment, a coupon distributor uses an OQS as at least one criterion to project or predict how often a coupon of a particular coupon campaign will be printed and/or redeemed. A coupon distributor may maintain historical data that associates OQS values of previous coupon campaigns with the actual number of times the corresponding coupons were printed and/or redeemed by potential customers. For example, a coupon distributor might maintain a history table as follows:

| PRINT/REDEMPTION HISTORY TABLE | | | |
| --- | --- | --- | --- |
| COUPON CAMPAIGN | OQS | PRINTS | REDEMPTION RATE |
| A | 9.3 | 112 | 54 |
| B | 6.5 | 63 | 27 |
| C | 7.2 | 70 | 21 |
| D | 8.1 | 98 | 33 |
| E | 7.6 | 65 | 20 |

Based on this Print/Redemption History Table, the coupon distributor may generate a projector function that represents the relationship between an OQS and the number of prints and/or redemption rate. Then, when the coupon distributor analyzes a proposed coupon campaign and generates an OQS for the campaign, then coupon distributor executes the projector function with the OQS as input in order to generate an estimate of the number of prints and/or redemptions that might occur if the coupon distributor runs the proposed campaign. Such an estimate may be used to adjust one or more terms of a proposed coupon campaign. For example, the coupon distributor might determine that the coupon provider should decrease the provider's expected or target number of prints to a more realistic value.

Additionally or alternatively, the coupon distributor might use the print/redemption projector to determine how much to advertise the coupon once the proposed coupon campaign is accepted. For example, the coupon distributor might determine, based on a relatively low projected number of prints given a particular OQS, that the coupon distributor should place the coupon more prominently (and/or more frequently) on the distributor's web pages.

The print/redemption estimate may also be used by the coupon distributor to determine a price for a coupon of the coupon campaign. For example, the coupon distributor might propose, to the coupon provider, based on a relatively low print estimate, a larger coupon value than what the coupon provider suggested.

4.4 Price Estimator

In an embodiment, a coupon distributor uses an OQS as at least one criterion in determining an amount to charge a coupon provider for the coupon distributor running a proposed coupon campaign. Generally, the higher an OQS, the lower the price the coupon distributor will determine for the proposed coupon campaign. For example, if the coupon distributor typically charges $0.10 per print for most or all coupon campaigns and the coupon distributor generates an OQS of 9.5 (on a 10-point scale) for a proposed coupon campaign, then the coupon distributor might choose to charge the coupon provider $0.07 per print due to the relatively high OQS.

Conversely, the lower an OQS, the higher the price the coupon distributor might determine for the proposed coupon campaign. For example, if the coupon distributor generates an OQS of 5.5 (on a 10-point scale) for a proposed coupon campaign, then the coupon distributor might choose to charge the coupon provider $0.15 per print due to the relatively low OQS. The higher price per print reflects that the coupon distributor will have to contribute more resources to running that proposed coupon campaign (for example, in terms of the number of impressions of the coupon) relative to the amount of resources need to run a higher quality campaign.

4.5 Presentation Component

In an embodiment, a coupon distributor uses an OQS (associated with a particular coupon campaign) as at least one criterion in determining how to present, to potential customers, a coupon of that particular coupon campaign. Coupons associated with relatively high OQS values will not need to be presented as often or as predominantly as coupons associated with relatively low OQS values. This is because higher quality coupons are going to attract more potential customers than lower quality coupons. Therefore, more resources of the coupon distributor might need to be allocated to influence the printing, by potential customers, of lower quality coupons. Printing correlates with redeeming in that the more prints by potential customers, the greater the number of redemptions. Thus, regardless of whether terms of coupon campaign require that payment to a coupon distributor is based on the number of prints or the number of redemptions, the coupon distributor desires potential customers to print numerous coupons of the corresponding coupon.

For example, the coupon distributor might place a coupon that is associated with a relatively low OQS on more web pages (that are provided by the coupon distributor and requested by potential customers) than a coupon that is associated with a relatively high OQS. As another example, the coupon distributor might place a coupon that is associated with a relatively low OQS more predominantly on such web pages than a coupon that is associated with relatively high OQS. A predominantly-displayed coupon may be one that is displayed on a home page of the coupon distributor. Additionally or alternatively, a predominantly-displayed coupon may be one that is displayed on the first page of a certain class of coupons. Non-limiting examples of the first page of a class of coupons include a page that is generated (along with other pages) in response to (a) a search query or (b) user selection of a link. Non-limiting examples of classes of coupons include grocery-related coupons, restaurant-related coupons, or highest value coupons. Thus, for example, a user might select a tab or a link that corresponds to all available coupons for baby products. In response to the selection, a majority of all available baby product coupons might only be displayed if the user paginates (i.e., selects subsequent pages) through the series of coupon pages that include coupons for baby products.

Additionally or alternatively, the coupon distributor might use a plurality of OQS, each corresponding to a different coupon, to select a set of coupons to display on each web page. The set of coupons are selected to ensure that there is a mix of higher quality coupons and lower quality coupons. If only coupons with relatively high OQS values are displayed on the first page of a multiple page result, then potential customers will tend to only look at the first page or the first few pages and will not paginate (i.e., request subsequent pages to view). However, if there are one or more high quality coupons on each page, then potential customers are more likely to paginate (i.e., view more pages), and thus be exposed to more coupons that are associated with relatively lower OQS values.

4.6 Content Acquisition

In an embodiment, a coupon distributor uses OQS scores as at least one criterion in determining where the coupon distributor should focus on acquiring additional coupons. For example, if the coupon distributor determines that coupons for baby food products are associated with relatively higher OQS values and that the coupon distributor is currently running few, if any, coupon campaigns in the baby food product category, then the coupon distributor might determine to contact manufacturers (coupon providers) that produce baby food products and solicit coupon campaigns from those manufacturers. Presenting higher quality coupons to potential customers causes those customers to return more often to the coupon distributor, which typically translates into more revenue for the coupon distributor. Also, because the coupon distributor knows that such coupons are generally of high quality, the coupon distributor is able to offer competitive pricing for distributing those coupons.

5.0 Implementation Mechanism—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
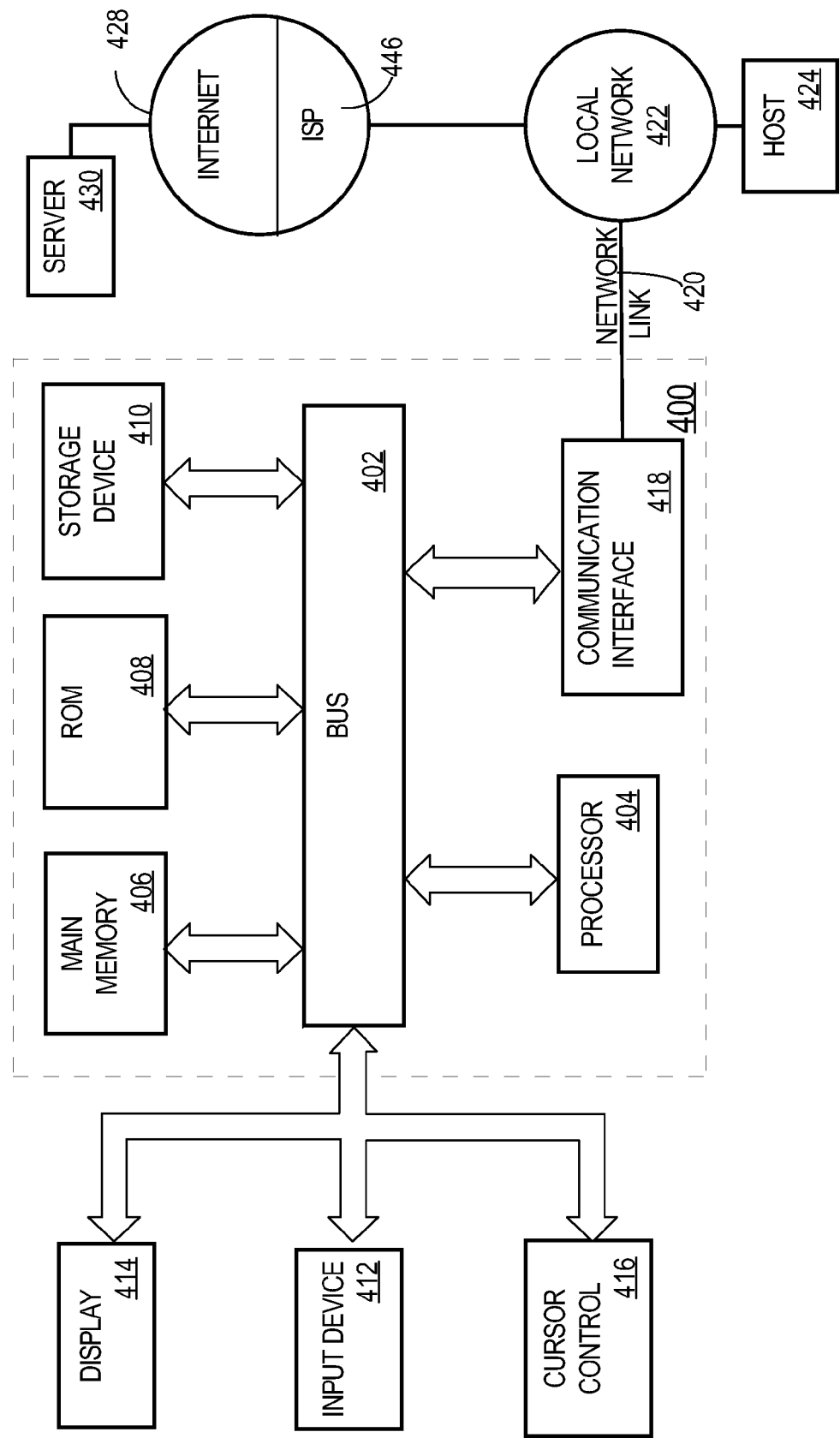
FIG. 4 illustrates a computer system upon which embodiments may be implemented.

For example, FIG. 4 is a block diagram that illustrates a computer system 400. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (for example, x) and a second axis (for example, y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage device 410, or other non-volatile storage for later execution.

6.0 Extensions and Alternatives

In the foregoing specification, embodiments have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   obtaining, by a computer, a plurality of attributes associated with a coupon campaign that has been offered to a coupon distributor by a coupon provider that is different than the coupon distributor and that provides a product or service to which a coupon of the coupon campaign pertains;
   wherein the plurality of attributes of the coupon campaign include attribute data of one or more prior coupon campaigns that completed previous to the coupon campaign and that are related to the coupon campaign;
   determining a plurality of values that correspond to the plurality of attributes; and
   generating, by the coupon distributor, using the computer and based on the plurality of values, a score that represents a quality of the coupon campaign.

2. The method of claim 1, wherein the plurality of attributes of the coupon campaign include one or more of coupon value, percentage discount represented by the coupon value, brand of a product of the coupon campaign, or product category to which the product belongs.

3. The method of claim 1, wherein the one or more prior coupon campaigns are:
   (a) for the same product as a product of the coupon campaign, or
   (b) for one or more products that are different than the product for the coupon campaign and
      (1) belong to a particular product category to which the product for the coupon campaign also belongs, or
      (2) that are of the same brand as a brand of the product for the coupon campaign.

4. The method of claim 1, wherein the obtaining, determining, and generating are performed prior to the coupon distributor accepting the coupon campaign.

5. The method of claim 4, further comprising determining, by the coupon distributor, based on the score, whether to accept the coupon campaign.

6. The method of claim 4, further comprising, prior to accepting the coupon campaign:
   determining, based on the score and using the computer, to modify one or more terms of the coupon campaign;
   generating, using the computer, one or more modified values based on one or more values, of the plurality of values, that correspond to the one or more terms;
   sending, from the coupon distributor to the coupon provider, the one or more modified values.

7. The method of claim 6, further comprising, receiving, from the coupon provider, response data that indicates whether the coupon provider accepts the coupon distributor running the coupon campaign based on the one or more modified values.

8. The method of claim 1, further comprising determining, based on the score, an amount for the coupon distributor to charge the coupon provider for running the coupon campaign.

9. The method of claim 8, wherein the amount to charge is a price per print, by a potential customer, of a coupon of the coupon campaign.

10. The method of claim 1, further comprising generating, based on the score, an estimate of a number of prints or redemptions that might occur if the coupon distributor runs the coupon campaign.

11. The method of claim 1, further comprising determining, based on the score, how often to or how to present, to potential customers, a coupon of the coupon campaign.

12. The method of claim 1, further comprising determining, based on a plurality of scores, each of which is associated with a different coupon campaign of a plurality of coupon campaigns, which coupons to display on a web page.

13. The method of claim 1, further comprising:
   determining, based on a plurality of scores, each of which is associated with a different coupon campaign of a plurality of coupon campaigns, one or more product categories;
   identifying one or more coupon providers that provide coupons for one or more products that belong to the one or more product categories.

14. The method of claim 1, wherein the plurality of attributes of the coupon campaign include penetration data that indicates a number or percentage of households that a brand of the coupon campaign has penetrated.

15. The method of claim 1, wherein the plurality of attributes of the coupon campaign include seasonality data that indicates, for a particular product or product category associated with the coupon campaign, one or more first metrics associated with a first time period and one or more second metrics associated with a second time period.

16. One or more storage media storing instructions which, when executed by one or more processors, cause:
   obtaining a plurality of attributes associated with a coupon campaign that has been offered to a coupon distributor by a coupon provider that is different than the coupon distributor and that provides a product or service to which a coupon of the coupon campaign pertains;
   wherein the plurality of attributes of the coupon campaign include attribute data of one or more prior coupon campaigns that completed previous to the coupon campaign and that are related to the coupon campaign;
   determining a plurality of values that correspond to the plurality of attributes; and
   generating, by the coupon distributor, based on the plurality of values, a score that represents a quality of the coupon campaign.

17. The one or more storage media of claim 16, wherein the plurality of attributes of the coupon campaign include one or more of coupon value, percentage discount represented by the coupon value, brand of a product of the coupon campaign, or product category to which the product belongs.

18. The one or more storage media of claim 16, wherein the one or more prior coupon campaigns are:
   (a) for the same product as a product of the coupon campaign, or
   (b) for one or more products that are different than the product for the coupon campaign and
      (1) belong to a particular product category to which the product for the coupon campaign also belongs, or
      (2) that are of the same brand as a brand of the product for the coupon campaign.

19. The one or more storage media of claim 16, wherein the obtaining, determining, and generating are performed prior to the coupon distributor accepting the coupon campaign.

20. The one or more storage media of claim 19 wherein the instructions, when executed by the one or more processors, further causes determining, by the coupon distributor, based on the score, whether to accept the coupon campaign.

21. The one or more storage media of claim 16, wherein the instructions, when executed by the one or more processors, further causes, prior to accepting the coupon campaign:
   determining, based on the score, to modify one or more terms of the coupon campaign;
   generating one or more modified values based on one or more values, of the plurality of values, that correspond to the one or more terms;
   sending, from the coupon distributor to the coupon provider, the one or more modified values.

22. The one or more storage media of claim 21, wherein the instructions, when executed by the one or more processors, further causes, receiving, from the coupon provider, response data that indicates whether the coupon provider accepts the coupon distributor running the coupon campaign based on the one or more modified values.

23. The one or more storage media of claim 16, wherein the instructions, when executed by the one or more processors, further causes determining, based on the score, an amount for the coupon distributor to charge the coupon provider for running the coupon campaign.

24. The one or more storage media of claim 23, wherein the amount to charge is a price per print, by a potential customer, of a coupon of the coupon campaign.

25. The one or more storage media of claim 16, wherein the instructions, when executed by the one or more processors, further causes generating, based on the score, an estimate of a number of prints or redemptions that might occur if the coupon distributor runs the coupon campaign.

26. The one or more storage media of claim 16, wherein the instructions, when executed by the one or more processors, further causes determining, based on the score, how often to or how to present, to potential customers, a coupon of the coupon campaign.

27. The one or more storage media of claim 16, wherein the instructions, when executed by the one or more processors, further causes determining, based on a plurality of scores, each of which is associated with a different coupon campaign of a plurality of coupon campaigns, which coupons to display on a web page.

28. The one or more storage media of claim 16, wherein the instructions, when executed by the one or more processors, further causes:
   determining, based on a plurality of scores, each of which is associated with a different coupon campaign of a plurality of coupon campaigns, one or more product categories;
   identifying one or more coupon providers that provide coupons for one or more products that belong to the one or more product categories.

29. The one or more storage media of claim 16, wherein the plurality of attributes of the coupon campaign include penetration data that indicates a number or percentage of households that a brand of the coupon campaign has penetrated.

30. The one or more storage media of claim 16, wherein the plurality of attributes of the coupon campaign include seasonality data that indicates, for a particular product or product category associated with the coupon campaign, one or more first metrics associated with a first time period and one or more second metrics associated with a second time period.

31. An apparatus comprising:
   a campaign data receiving unit that is configured to obtain a plurality of attributes associated with a coupon campaign that has been offered to a coupon distributor by a coupon provider that is different than the coupon distributor and that provides a product or service to which a coupon of the coupon campaign pertains;
   wherein the plurality of attributes of the coupon campaign include attribute data of one or more prior coupon campaigns that completed previous to the coupon campaign and that are related to the coupon campaign;
   wherein the campaign data receiving unit is further configured to determine a plurality of values that correspond to the plurality of attributes; and
   an offer quality score (OQS) generation unit that is configured to generate, by the coupon distributor, based on the plurality of values, a score that represents a quality of the coupon campaign.

32. The apparatus of claim 31, wherein the plurality of attributes of the coupon campaign include one or more of coupon value, percentage discount represented by the coupon value, brand of a product of the coupon campaign, or product category to which the product belongs.

33. The apparatus of claim 31, wherein the one or more prior coupon campaigns are:
   (a) for the same product as a product of the coupon campaign, or (b) for one or more products that are different than the product for the coupon campaign and
   (1) belong to a particular product category to which the product for the coupon campaign also belongs, or
   (2) that are of the same brand as a brand of the product for the coupon campaign.

34. The apparatus of claim 31, wherein the OQS generation unit is configured to generate the score prior to the coupon distributor accepting the coupon campaign.

35. The apparatus of claim 34, further comprising a proposed campaign acceptance unit that is configured to determine, based on the score, whether to accept the coupon campaign.

36. The apparatus of claim 34, further comprising a logic, implemented at least partially in hardware, that is configured to:
   determine, based on the score, to modify one or more terms of the coupon campaign;
   generate one or more modified values based on one or more values, of the plurality of values, that correspond to the one or more terms;
   send, from the coupon distributor to the coupon provider, the one or more modified values.

37. The apparatus of claim 36, further comprising a second logic, implemented at least partially in hardware, that is configured to receive, from the coupon provider, response data that indicates whether the coupon provider accepts the coupon distributor running the coupon campaign based on the one or more modified values.

38. The apparatus of claim 31, further comprising a logic, implemented at least partially in hardware, that is configured to determine, based on the score, an amount for the coupon distributor to charge the coupon provider for running the coupon campaign.

39. The apparatus of claim 31, further comprising a logic, implemented at least partially in hardware, that is configured to generate, based on the score, an estimate of a number of prints of redemptions that might occur if the coupon distributor runs the coupon campaign.

40. The apparatus of claim 31, further comprising a logic, implemented at least partially in hardware, that is configured to determine, based on the score, how often to or how to present, to potential customers, a coupon of the coupon campaign.

41. The apparatus of claim 31, further comprising a logic, implemented at least partially in hardware, that is configured to determine, based on a plurality of scores, each of which is associated with a different coupon campaign of a plurality of coupon campaigns, which coupons to display on a web page.

42. The apparatus of claim 31, further comprising:
   a first logic, implemented at least partially in hardware, that is configured to determine, based on a plurality of scores, each of which is associated with a different coupon campaign of a plurality of coupon campaigns, one or more product categories;
   a second logic, implemented at least partially in hardware, that is configured to identify one or more coupon providers that provide coupons for one or more products that belong to the one or more product categories.

43. The apparatus of claim 31, wherein the plurality of attributes of the coupon campaign include penetration data that indicates a number of percentage of households that a brand of the coupon campaign has penetrated.

44. The apparatus of claim 31, wherein the plurality of attributes of the coupon campaign include seasonality data that indicates, for a particular product or product category associated with the coupon campaign, one or more first metrics associated with a first time period and one or more second metrics associated with a second time period.

45. The apparatus of claim 38, wherein the amount to charge is a price per print, by a potential customer, of a coupon of the coupon campaign.

\* \* \* \* \*